(12) United States Patent
Yoshii

(10) Patent No.: US 9,058,537 B2
(45) Date of Patent: Jun. 16, 2015

(54) METHOD FOR ESTIMATING ATTRIBUTE OF OBJECT, APPARATUS THEREOF, AND STORAGE MEDIUM

(75) Inventor: Hiroto Yoshii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 13/186,882

(22) Filed: Jul. 20, 2011

(65) Prior Publication Data

US 2012/0020558 A1 Jan. 26, 2012

(30) Foreign Application Priority Data

Jul. 24, 2010 (JP) ................................ 2010-166603

(51) Int. Cl.
*G06K 9/00* (2006.01)
*G06K 9/66* (2006.01)
*G06K 9/68* (2006.01)
*G06K 9/38* (2006.01)
*G06K 9/32* (2006.01)
*G06K 9/46* (2006.01)
*G06K 9/62* (2006.01)
*G06T 7/00* (2006.01)

(52) U.S. Cl.
CPC ............ *G06K 9/3233* (2013.01); *G06K 9/4604* (2013.01); *G06K 9/6202* (2013.01); *G06T 7/0044* (2013.01)

(58) Field of Classification Search
USPC ......................... 382/168–172, 181–231, 271
See application file for complete search history.

(56) References Cited

U.S. PATENT DOCUMENTS

| | | | | |
|---|---|---|---|---|
| 6,393,147 | B2 * | 5/2002 | Danneels et al. | 382/165 |
| 7,123,745 | B1 * | 10/2006 | Lee | 382/103 |
| 2003/0161500 | A1 * | 8/2003 | Blake et al. | 382/103 |
| 2005/0025357 | A1 * | 2/2005 | Landwehr et al. | 382/170 |
| 2005/0100200 | A1 * | 5/2005 | Abiko et al. | 382/124 |

FOREIGN PATENT DOCUMENTS

| | | |
|---|---|---|
| JP | 2003-323616 A | 11/2003 |
| JP | 2008-152555 A | 7/2008 |
| JP | 2008-282267 A | 11/2008 |

OTHER PUBLICATIONS

Takahiro Nakamura et al. "Fingerprint Verification using Reliability Evaluation of Non-matching Minutiae". IEICE Technical Report: Mar. 10, 2006: vol. 105, No. 674: p. 167-172.

* cited by examiner

*Primary Examiner* — Alex Liew
(74) *Attorney, Agent, or Firm* — Canon USA Inc. IP Division

(57) ABSTRACT

An information processing method includes detecting a partial area configuring a target object from an input image, evaluating appropriateness of the detection result, voting with respect to the target object based on the detection result and the evaluation result, and identifying an attribute of the target object based on the voting result.

19 Claims, 10 Drawing Sheets

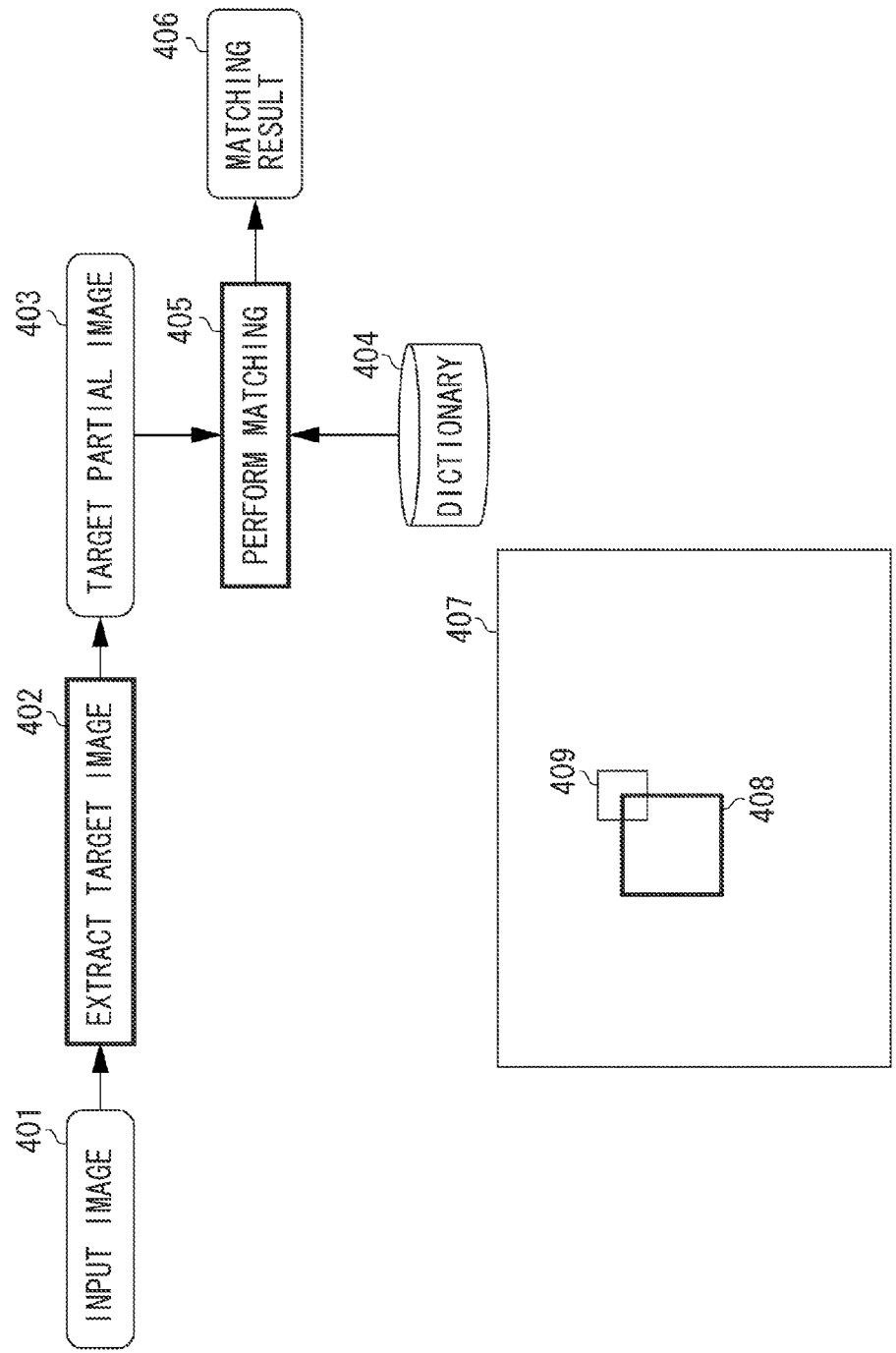

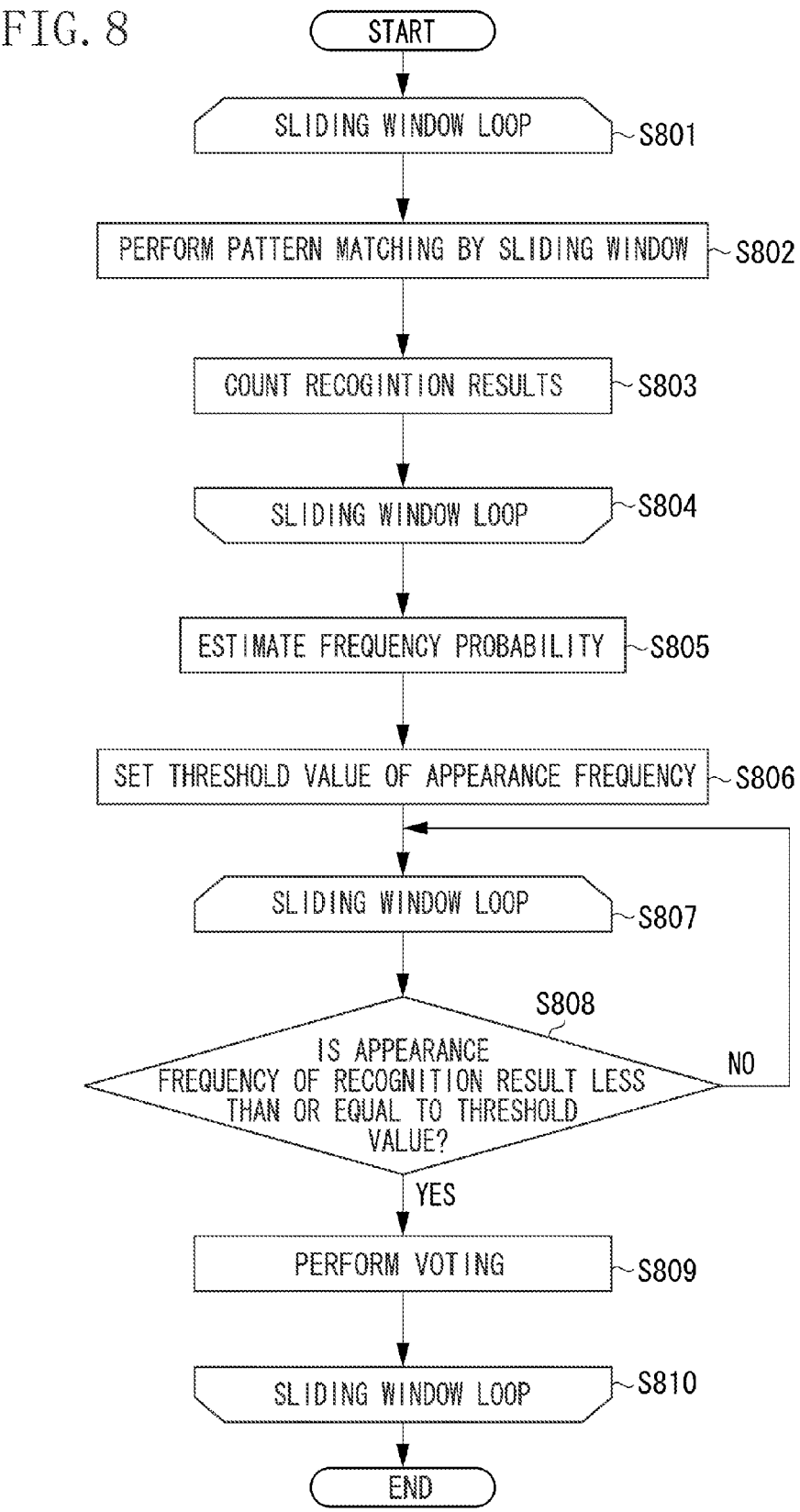

METHOD FOR ESTIMATING ATTRIBUTE OF OBJECT, APPARATUS THEREOF, AND STORAGE MEDIUM

BACKGROUND OF THE INVENTION

1. Field of the Invention

The present invention relates to an information processing method for estimating an attribute of a target object, such as an existence position, orientation, and category including name and type, using a captured image of the target object. The target object is an arbitrary body, such as a person, an animal, a car, a camera, a printer, or a semiconductor substrate.

2. Description of the Related Art

Japanese Patent Application Laid-Open No. 2003-323616 discusses a conventional object detection method referred to as a generalized Hough transform. The generalized Hough transform is a method for acquiring a position or an orientation of a target object to be detected, using a shape of a portion of the target object. More specifically, the position of a target object in an input image is acquired by detecting a portion of the target object included in the input image and performing voting on a reference position of the target object using the detection result.

However, according to the above-described conventional method, the object may be falsely detected, i.e., the object may be detected at a position where it does not actually exist. In particular, the object is falsely detected when there is a monotonous pattern such as a plurality of parallel lines in the input image. If an area of the parallel lines is input to the detection process, all results of detecting a portion of the target object become the same, so that the object is falsely detected. In other words, since the same position collects the votes when it is actually necessary for the votes to be directed to different positions, the target object is detected at a position where the object does not actually exist.

SUMMARY OF THE INVENTION

According to an aspect of the present invention, an information processing method includes detecting a partial area configuring a target object from an input image, evaluating appropriateness of the detection result, voting with respect to a target object based on the detection result and the evaluation result, and identifying an attribute of the target object based on the voting result.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a detection process of a partial area.

FIG. 8 is a flowchart illustrating in detail a voting appropriateness evaluation process.

DESCRIPTION OF THE EMBODIMENTS

Various exemplary embodiments, features, and aspects of the invention will be described in detail below with reference to the drawings.

Figure 1:
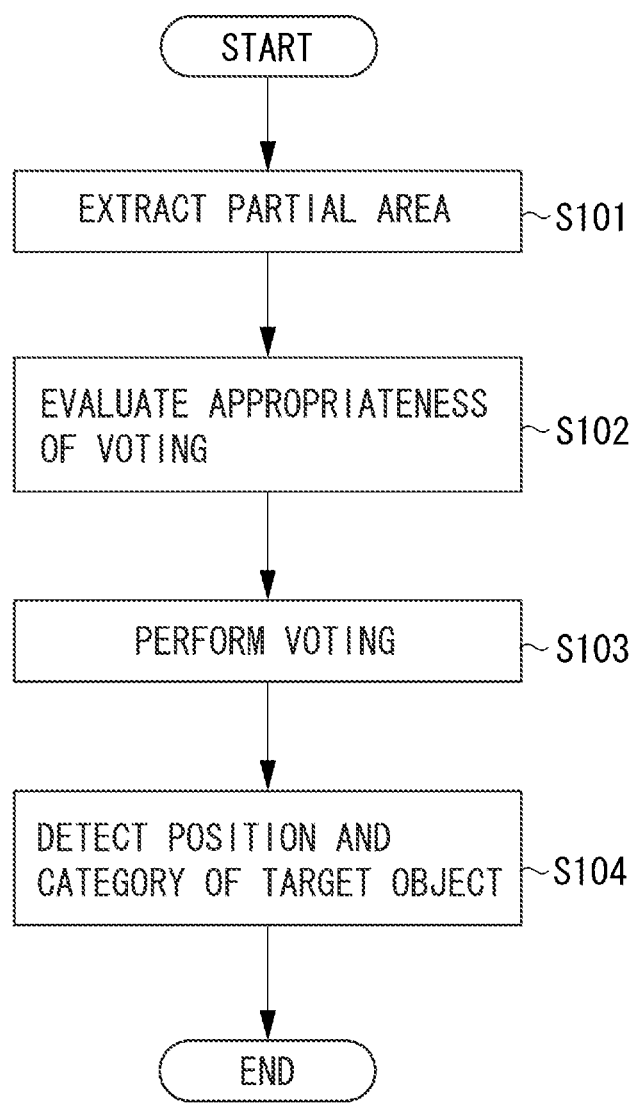
FIG. 1 is a flowchart illustrating a process procedure according to a first exemplary embodiment of the present invention.

FIG. 1 is a flowchart illustrating a basic process procedure of an information processing method according to a first exemplary embodiment of the present invention. A configuration of an apparatus in which the information processing method according to the present exemplary embodiment is implemented will be described below before referring to FIG. 1.

Figure 2:
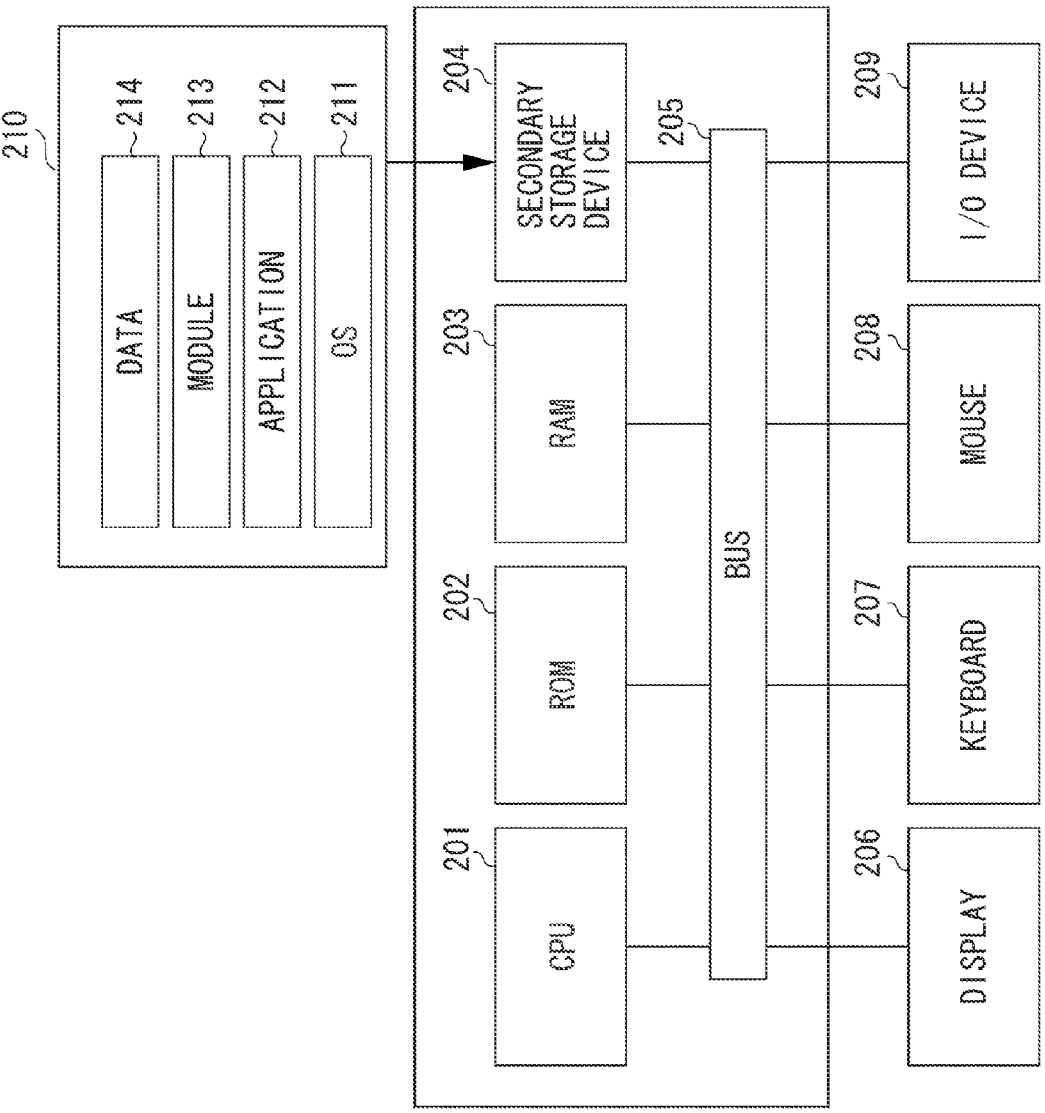
FIG. 2 illustrates a hardware configuration of an information processing apparatus according to an exemplary embodiment of the present invention.

FIG. 2 is a block diagram illustrating a hardware configuration of an information processing apparatus according to all the exemplary embodiments described below. The hardware configuration illustrated in FIG. 2 is modeled on a personal computer as a most typical information processing apparatus. However, the information processing apparatus may be an integrated device, a digital camera, or a hand-held device.

Referring to FIG. 2, a central processing unit (CPU) 201 executes various programs including the process procedure corresponding to flowcharts described below, and controls each unit in the apparatus. A read only memory (ROM) 202 is a non-volatile memory, and stores programs that are necessary for initially activating the information processing apparatus. A random access memory (RAM) 203 provides a work area of the CPU 201 and temporarily stores the programs read from a secondary storage device 204. The secondary storage device 204 stores programs 210 used by the CPU 201. The programs 210 include an operating system (OS) 211, an application 212, a module 213, and data 214.

The CPU 201, the ROM 202, the RAM 203, and the secondary storage device 204 exchange information with each other via a bus 205. Further, the information processing apparatus is connected to a display 206, a keyboard 207, a mouse 208, and an input/output (I/O) device 209 via the bus 205.

The display 206 is used for displaying to a user, information such as a processing result or a progress in the processing. The keyboard 207 and the mouse 208 are used by the user to input instructions. In particular, the mouse 208 is used to input two-dimensional and three-dimensional positional relationships. The I/O device 209 is used for acquiring a new pattern or a registration pattern. For example, if a two-dimensional image is to be used as the pattern, a camera which captures the target object is employed as the I/O device 209. Further, the I/O device 209 outputs the information processing result to other information processing apparatuses.

According to the present exemplary embodiment, step S101 to step S104 illustrated in FIG. 1 are executed. In step S101, a partial area of the target object is detected in the input image. This is generally realized by performing pattern matching between a previously-learned partial area of the target object and the input image. Pattern matching methods such as a support vector machine, a classification tree, and template matching may be employed.

In step S102, appropriateness of voting on the detection results of the partial area is evaluated. In step S103, voting is performed using only the result determined to be appropriate in the evaluation process performed in step S102. In step S104, the voting results are counted, and the position, the orientation, and the type (category) of the target object are detected (identified). The evaluation of the voting appropriateness performed in step S102 is a feature of the present exemplary embodiment which is not included in the conventional generalized Hough transform.

The detection of the partial area performed in step S101 illustrated in FIG. 1 will be described in detail below with reference to FIGS. 3 and 4. Further, the voting appropriateness evaluation process performed in step S102 illustrated in FIG. 1 will be described in detail below with reference to FIGS. 7A, 7B, 7C, and 8. Furthermore, the voting process performed in step S103 will be described in detail below with reference to FIGS. 5A and 5B. Moreover, the detection of the position and the type of the target object performed in step S104 illustrated in FIG. 1 will be described in detail below with reference to FIG. 6.

In the generalized Hough transform method, there is a step for detecting a fraction of the target object in the input image. For example, when detecting a simple line image such as a square, a line segment or a corner of the input image is detected. In such a case, the detection can be realized by a line segment detection routine or a corner detection routine.

In contrast, if the shape of the target object is complex, the simple detection process such as the line segment routine or the corner detection routine cannot be applied. In such a case, there is a method for detecting the fraction of the target object by performing pattern matching between the partial area included in the target object and the partial area in the input image. The present exemplary embodiment is based on the method for detecting the partial area of the target object using pattern matching and a description will be made on the premise thereof. However, the present exemplary embodiment may also be realized by a method using a basic partial figure detection routine, such as the line segment detection routine or the corner detection routine.

The process performed in the partial area detection step S101 is performed in either a learning phase or a recognition phase. The learning phase will be described below with reference to FIG. 3, and the recognition phase will be described below with reference to FIG. 4. The learning phase includes three processes, i.e., a partial area extraction process 302, a feature amount extraction process 304, and a learning process 306.

Figure 3:
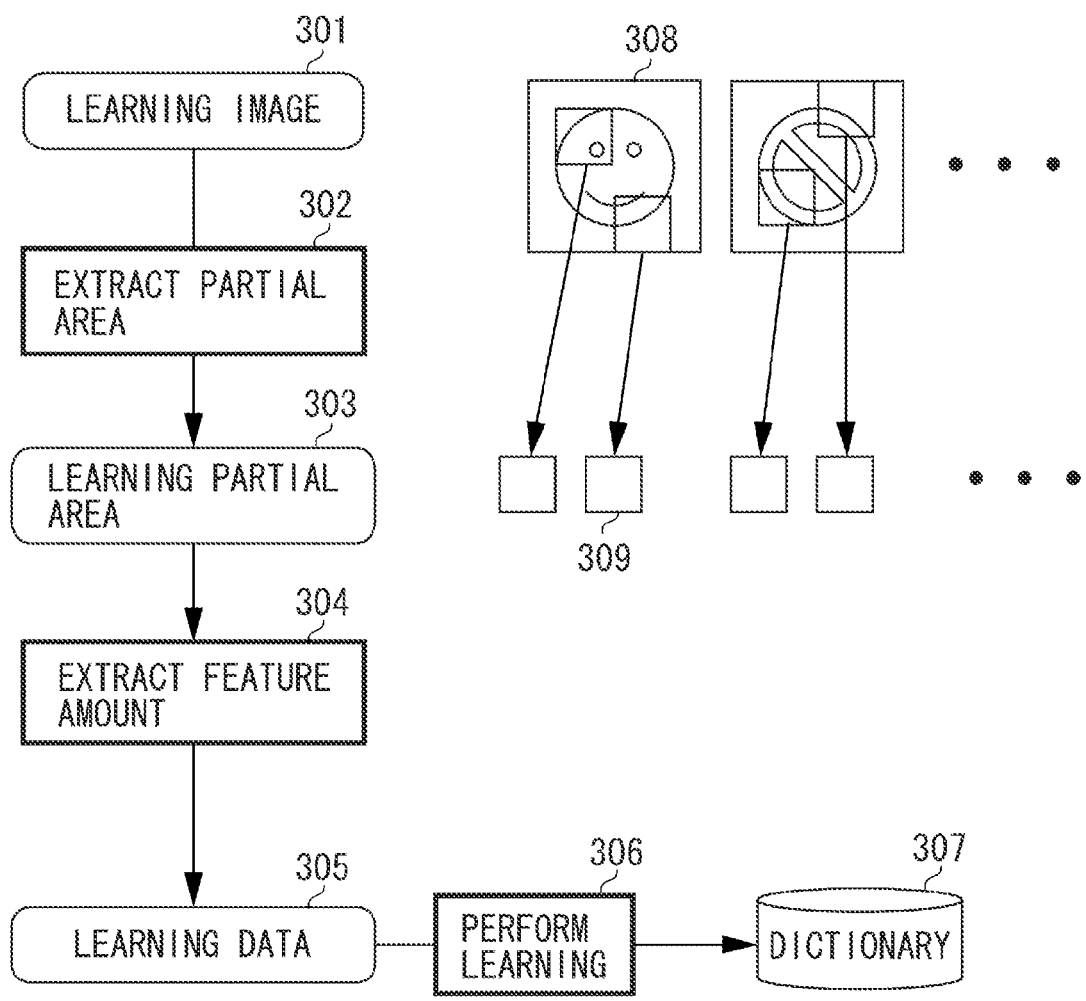
FIG. 3 illustrates a learning phase.

Referring to FIG. 3, a learning image 301 is acquired in the learning phase. An image group 308 indicates an example of the learning image 301, and different types of target objects are captured in the image group 308. However, the images of the same target object captured from different viewpoints may be used. Further, the images in which the same target object is captured in different sizes may be used. According to the present example, it is assumed that there are K types of the learning images. In an extreme example, if each of the learning images is of a different type, the number of learning images becomes K. In another extreme example, if there are only two types of learning images, i.e., one in which the target object is captured and the other in which the target object is not captured, K becomes 2. Furthermore, K types of learning images may be acquired by capturing the image of the same object image in a number of different orientations equal to K.

In the partial area extraction process 302, a learning partial area 303 included in the target object is extracted from the learning image 301. The extracted partial area 303 becomes the image to be actually learned. An area group 309 illustrates an example of the learning partial area 303. Two partial areas are extracted for each learning image in the area group 309. The number of partial areas to be extracted may be different for each learning image or may be the same. It is assumed that the total number of learning partial areas 303 to be acquired becomes N in the end.

In the feature amount extraction process 304, a feature amount is extracted from the learning partial area 303. There are various types of the feature amount. For example, an edge which is enhanced by performing a filtering process using a Sobel filter may be the feature amount. Further, a scale-invariant feature transform (SIFT) feature amount, in which a large amount of calculation is necessary, may be extracted as the feature amount. Furthermore, a luminance value of each pixel in the image may be directly employed as the feature without performing particular processing in the feature amount extraction process 304. The data acquired by performing the feature amount extraction process 304 on the learning partial area 303 becomes the learning data 305. The learning data 305 is generally N number of d-dimensional vector data.

In the learning process 306, learning is performed using the learning data 305 to generate a dictionary 307. A learning algorithm of the learning process 306 may be any process as long as it is a machine learning algorithm. For example, algorithms such as the support vector machine and the classification tree may be used. Further, if a template matching algorithm, i.e., the simplest algorithm, is employed, the learning data 305 is directly stored as the dictionary 307.

The partial area detection in step S101 performed in the recognition phase will be described below with reference to FIG. 4. Referring to FIG. 4, the recognition phase includes two processes, i.e., a target image extraction process 402 and a matching process 405. In the target image extraction process 402, a target partial image 403 to be the target of pattern matching is extracted from an input image 401. The target image extraction process 402 is repeatedly performed by gradually shifting an extracting position, so that the target partial image 403 is extracted from all areas in the input image. Such a process is referred to as a sliding window process. An input image 407 is scanned by a sliding window 409 to extract a target object 408 in the input image 407. The target object 408 is a simple square for ease of description. A similar process may be performed even when the target object is a complex shape, such as the image group 308 illustrated in FIG. 3.

In the matching process 405, matching is performed between the target partial image 403 and a dictionary 404. The dictionary 404 illustrated in FIG. 4 is the same as the dictionary 307 illustrated in FIG. 3. Further, the module used in performing the matching process 405 corresponds to the algorithm used in the learning phase. Furthermore, the matching process 405 includes the module which performs the feature amount extraction process 304 illustrated in FIG. 3 on the target partial image 403. As a result, a matching result 406 of the target partial image 403 in each position is acquired in the recognition phase.

When the partial area detection in step S101 illustrated in FIG. 1 completes, in step S102, the appropriateness evaluation for checking the appropriateness of the result of the partial area detection is performed. The voting process performed in step S103 will be described in detail below with reference to FIGS. 5A and 5B, before describing the process performed in step S102. Further, the detection of the position, the orientation, and the type of the target object performed in step S104 will be described in detail below with reference to FIG. 6 before describing the process performed in step S102.

Figure 5A:
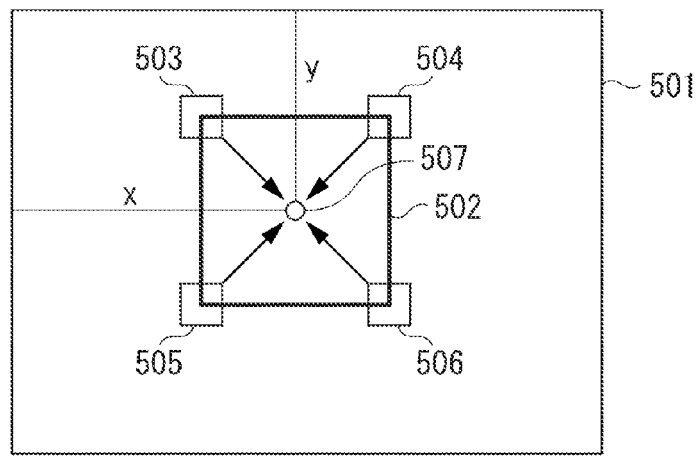
FIGS. 5A and 5B illustrate a voting process.

FIG. 5A illustrates the voting process. Referring to FIG. 5, a target object 502 is captured in an input image 501. The input image 501 is a voting surface at the same time as being the input image. The specific implementation of the voting surface will be described below. Further, four corner areas 503, 504, 505, and 506 are illustrated to represent the partial areas of the target object. The partial areas 503, 504, 505, and 506 are detected by moving the sliding window. As a result, voting on a center position 507 of the target object is performed from each of the partial areas 503, 504, 505, and 506.

Figure 5B:
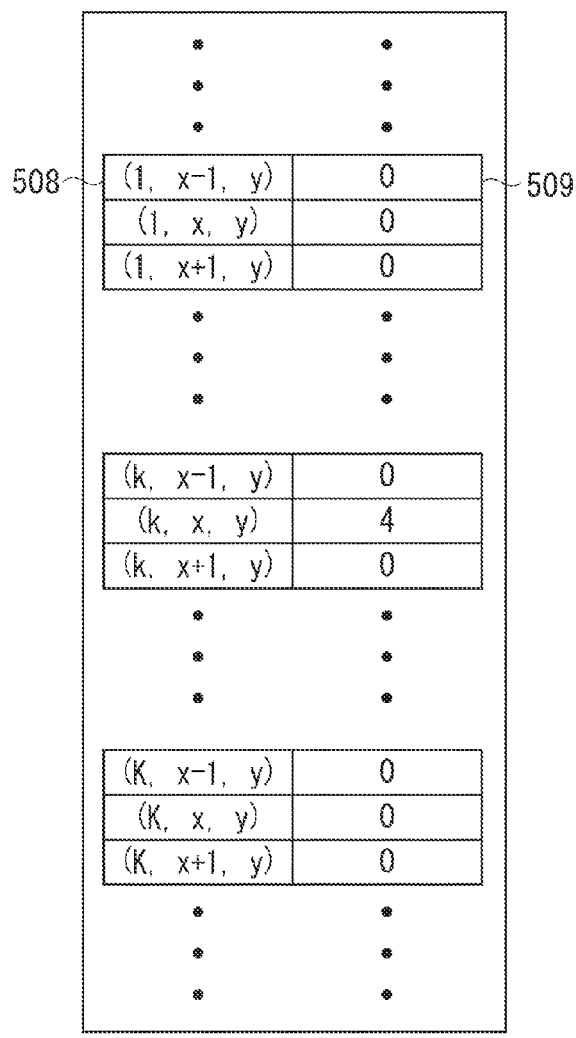

FIG. 5B illustrates specifically the implementation of the voting surface. Referring to FIG. 5B, the voting surface is a table, and is a collection of small tables corresponding to the types (K number) of the learning image. The table includes an address 508 and a voting score 509 as the content. The address 508 is configured with a combination of a type number k of the learning image and a two-dimensional position in the input image 501. The size of the small table is the size of an existence range of the center position of the target object, and is normally a total number of pixels in the input image. If the input image is X pixels in a horizontal direction and Y pixels in a vertical direction, the total number of rows in the table illustrated in FIG. 5B thus becomes K*X*Y.

If an identification accuracy of the existence position of the target object can be coarser as compared to the pixels in the input image, the size of the table can be reduced by quantizing the existence position. For example, if a square portion which is 2×2 pixels is collectively quantized, the size of the table illustrated in FIG. 5B becomes ¼. The voting is performed four times from the partial areas 503, 504, 505, and 506 as illustrated in FIG. 5A, so that, if the type number of the target object 502 is k and the center position 507 is (x, y), the score of the address (k, x, y) becomes 4.

The example of FIG. 5A only illustrates the recognition and detection results of the window in four locations, i.e., the partial areas 503, 504, 505, and 506, and the voting results thereof. However, the recognition and detection results of the window in other positions also exist. Further, in the example illustrated in FIG. 5B, the score 509 is incremented by 1 for each voting. However, voting may be weighted for each partial image, so that a value such as 0.5 may be added.

Figure 6:
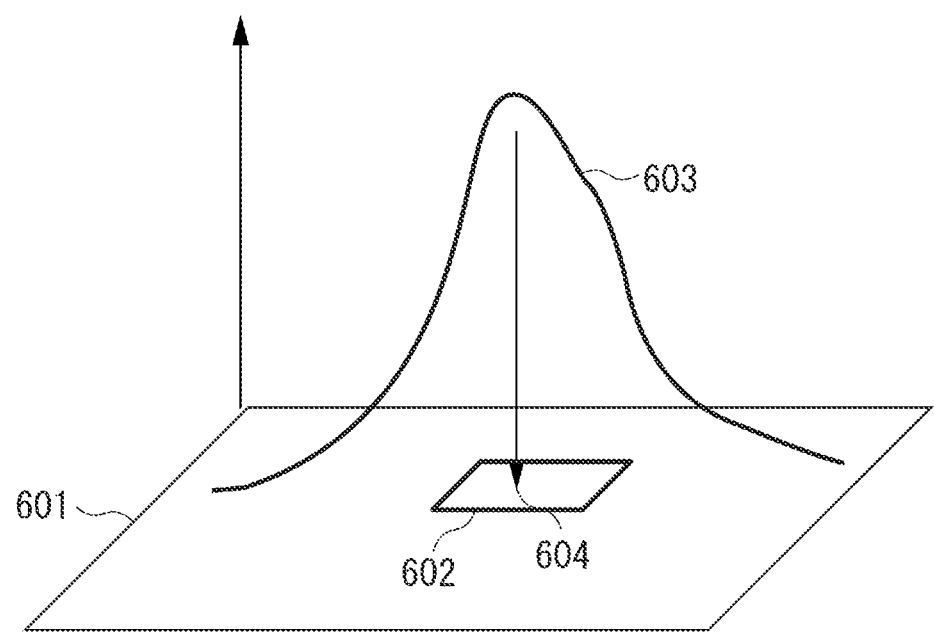
FIG. 6 illustrates a voting result.

The detection of the position, the orientation, and the type of the target object performed in step S104 illustrated in FIG. 1 will be described below. FIG. 6 illustrates an example of distribution of scores that are the sums of all voting results described with reference to FIG. 5B. FIG. 6 is a three-dimensional drawing of one small table illustrated in FIG. 5B, and can be viewed as displaying an existence probability of a learning image in the input image. Referring to FIG. 6, an input image 601 and a target object 602 respectively correspond to the input image 501 and the target object 502 illustrated in FIG. 5A.

In FIG. 6, the voting result (i.e., the score) is indicated in a height direction, and the voting score becomes higher as the height increases. The voting score is shaped as a distribution 603, and the target object is detected in a peak position 604. The voting score distribution illustrated in FIG. 6 is a monomodal distribution. However, the distribution may have a plurality of peaks. In such a case, it is often appropriate to determine that there is a plurality of target objects in the input image. The existence positions of the plurality of target objects are thus acquired by acquiring local peaks (local maximum values) in the X-Y plane.

On the other hand, the distribution shape of the voting score may be a discontinuous jagged pattern, instead of a smooth curve such as the distribution 603 illustrated in FIG. 6. In such a case, it may be determined that one target object exists in the position of the highest point. All types of the target object can be detected by detecting the voting peak position as illustrated in FIG. 6 for each of the K voting surfaces.

Figure 10:
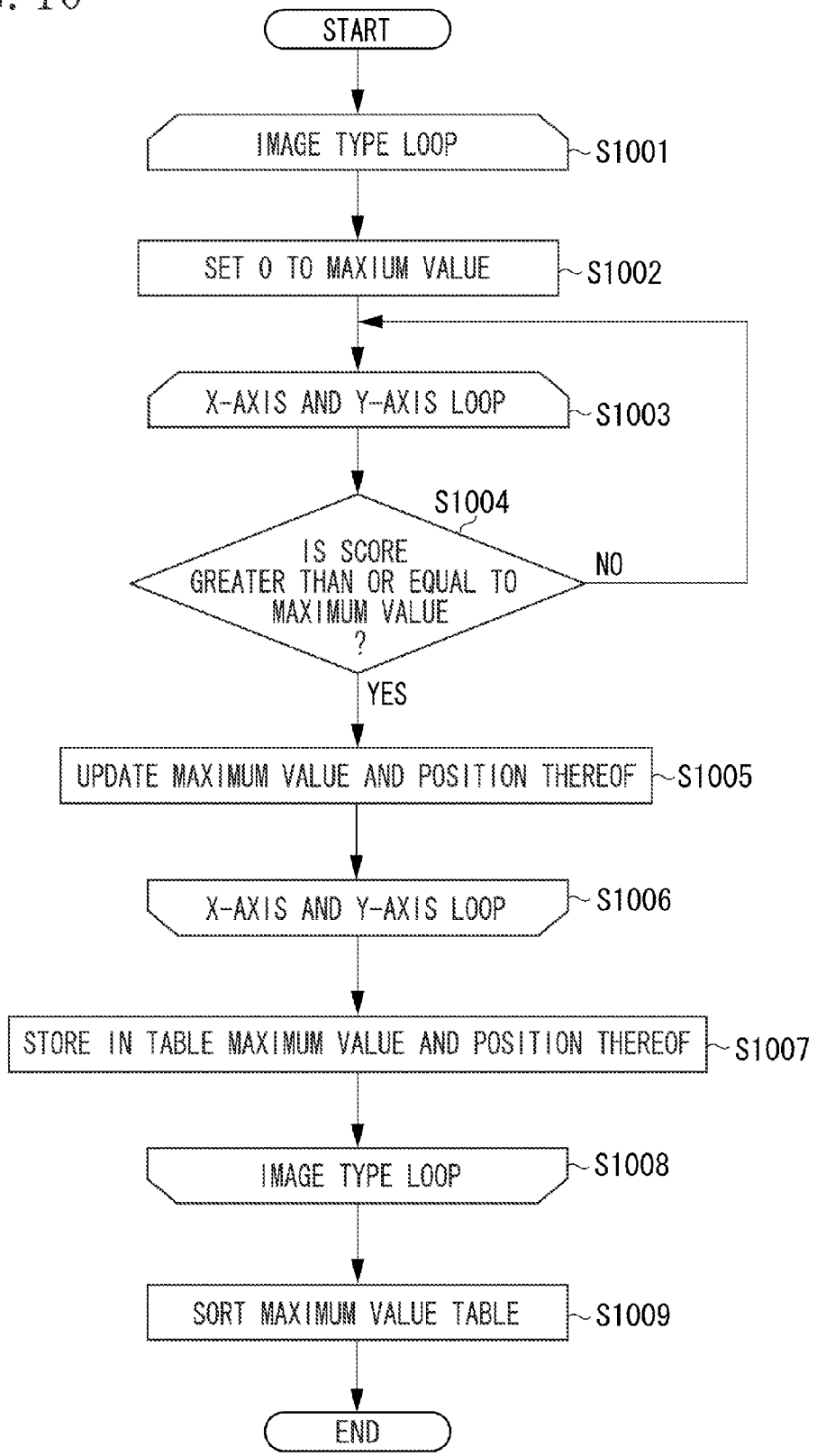
FIG. 10 is a flowchart illustrating detection of a position and type of the target object.

FIG. 10 is a flowchart illustrating the above-described process of detecting the position, the orientation, and the type of the target object. The process illustrated in FIG. 10 includes double loop including an image type loop from step S1001 to step S1008, and an X-axis and Y-axis loop from step S1003 to step S1006. The image type loop from step S1001 to step S1008 is executed K times. The highest score with respect to each type of the target object is acquired and counted by performing the inner X-axis and Y-axis loop. Specifically, in step S1002, 0 is set to the maximum value. In step S1004, whether the score of each position is greater than the maximum value is checked while scanning in the X axis and the Y axis. If the score of the position is greater than the current maximum value (YES in step S1004), the process proceeds to step S1005. In step S1005, the maximum value and the position thereof is updated. When the X-axis and Y-axis loop is completed, the process proceeds to step S1007. In step S1007, the maximum value and the position thereof is stored in the table as the score and the existence position of the target object.

In step S1008, the image type loop ends, so that the position of the highest existence probability and the score for all types of the registered image become stored in the table. In step S1009, the table is sorted in an order of higher scores. The type and the position of the target object of high existence probability are thus obtained in the order of the scores.

Figure 7A:
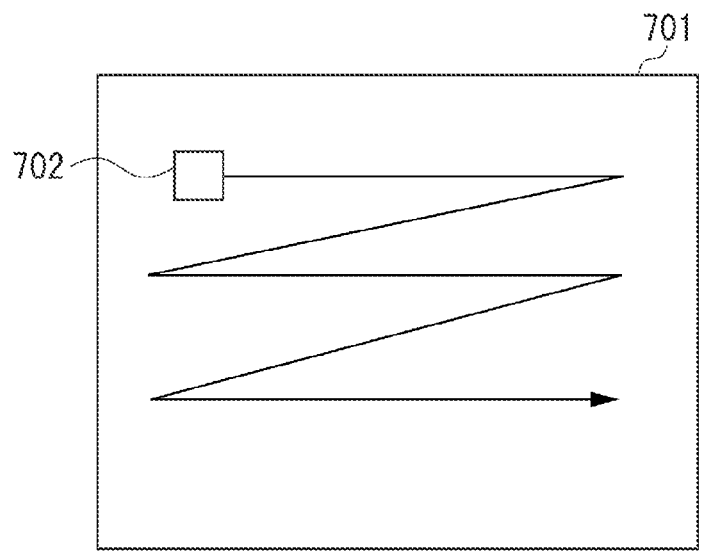
FIGS. 7A, 7B, and 7C illustrate detection states of the partial area.
Figure 7B:
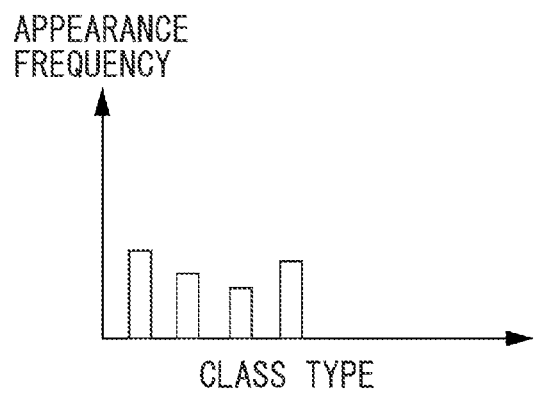
Figure 7C:
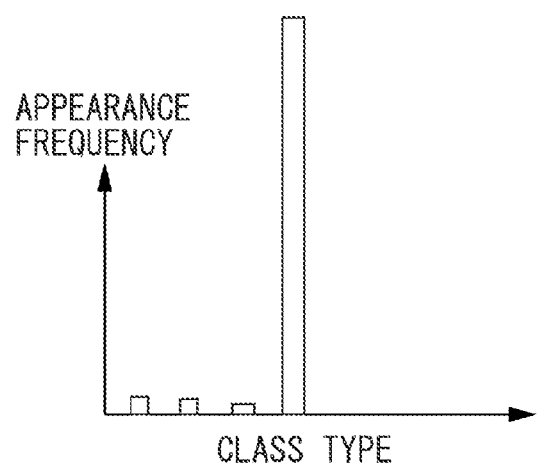

The appropriateness evaluation process performed in step S102 illustrated in FIG. 1 will be described below with reference to FIGS. 7A, 7B, 7C, and 8. Referring to FIGS. 7A, 7B, and 7C, an input image 701 is the same as the input image 401 illustrated in FIG. 4. Further, a sliding window 702 illustrated in FIG. 7A is the same as the sliding window 409 illustrated in FIG. 4. Two graphs illustrated in FIGS. 7B and 7C are histograms of the recognition results of the partial areas. In step S802 of a sliding window loop from step S801 to step S804 illustrated in FIG. 8, pattern matching is performed every time the sliding window 702 moves in the input image 701. In step S803, the recognition results are counted. The horizontal axis of graphs illustrated in FIGS. 7B and 7C indicates a class type, and the vertical axis indicates an appearance frequency as an appearance status. The class indicates the type of the learning partial area 302 illustrated in FIG. 3.

According to FIG. 3, there is N learning partial areas, so that N bins exist in the histograms illustrated in FIGS. 7B and 7C. The number of bins is not the number of types of the learning images, i.e., K. A histogram of M classes may also be generated by collecting the N learning partial areas to M sets (M<N), and viewing the elements in each of the sets to be the same. As a result of entire scanning of the sliding window 702 in the input image 701, the appearance frequency distribution 703 or 704 for each class can be acquired.

If the target object exits in the input image, the appearance frequency of the class of the partial area configuring the target object becomes slightly higher. However, the distribution 703 can be basically approximated to follow a probability distribution. More specifically, if N>>Z when Z is a total number of scanning the sliding window in the input image, the distribution can be approximated by a Poisson distribution. The distribution can be approximated by a binomial distribution for other cases. The distribution can also be approximated by other probability distributions. For example, a parameter of an assumed probability distribution is calculated using statistical information such as a frequency average of the histogram. Such a process is an estimation of the frequency probability performed in step S805 illustrated in FIG. 8.

In step S806, the appearance frequency which only occurs at the probability of less than or equal to 0.001% is calculated using the acquired parameter, and is set as a threshold value of the appearance frequency. The value of the probability corresponding to the threshold value is previously determined, similarly as a P value used in statistical estimation. For example, if the Poisson distribution is assumed as the probability distribution, the distribution frequency thereof is expressed by equation 1.

$$f(x) = e^{-\lambda} \lambda^x / x!$$ (equation 1)

A parameter $\lambda$ is estimated from the voting histogram 703 or 704. More specifically, an average number of voting is set to $\lambda$, and if the sum of the number of voting is N/10 (i.e., 1/10 of the number of bins N of the histogram), $\lambda$ becomes 0.1.

In such a case, the estimated appearance frequency becoming 0 times occurs at a probability of 90%, becoming once at 9%, becoming twice at 0.45%, and becoming three times at 0.015%. In other words, the appearance frequency is 0 for a majority of the classes, and it is a rare event for the same class to be recognized and detected three times (i.e., 0.015% probability). And the probability is less than 0.001% for the appearance frequency becoming 4 times. The threshold value of the appearance frequency according to the present example is thus set to four times.

For example, the appearance frequency of a fourth bin is extremely large in the histogram 704. In such a case, it is evaluated that the result of recognizing and detecting a partial area as the fourth class is not appropriate, so that voting is not performed. In contrast, all detection results are evaluated as appropriate in the histogram 703, so that voting is performed.

The event of an extremely low probability frequency (i.e., an event in which a bin in the histogram protrudes,) occurs when one type of partial area in the target object is detected with respect to an entire area of a simple portion in the input image, such as parallel lines. Since the number of types N of the partial area is large, it is unnatural for only one type of partial area to be detected, even when a large number of simple patterns exist in the input image. According to the present exemplary embodiment, such abnormal recognition and detection result is eliminated or substantially invalidated by the evaluation that performs statistical estimation.

Referring to FIG. 8, the sliding window re-scans the input image in the loop process from performed in step S807 to step S810. In step S808 (i.e., a determination step in the loop), it is determined whether the appearance frequency of the recognition result is less than or equal to the threshold value determined in step S806, by referring to the histogram 703. If the appearance frequency exceeds the threshold value (NO in step S808), the process returns to step S807 without performing voting. If the appearance frequency is less than or equal to the threshold value (YES in step S808), the process proceeds to step S809. In step S809, voting is performed in the loop. Voting may be performed even when the appearance frequency exceeds the threshold value in step S808 by reducing the weight of the vote (e.g., to half of the original vote). Further, not performing voting can be viewed as setting an intensity of voting to 0.

Furthermore, it is the most natural implementation that the weight of the vote can be adjusted by multiplying to the votes an occurrence probability of the appearance frequency estimated in step S805. The above-described flowchart illustrated in FIG. 8 corresponds to the partial area detection process performed in step S101, the voting appropriateness evaluation process in step S102, and the voting process in step S103 illustrated in FIG. 1.

A second exemplary embodiment will be described below. According to the first exemplary embodiment, the abnormal recognition and detection result is determined by counting the recognition and detection results of the partial areas with respect to the entire input image. In contrast, according to the second exemplary embodiment, the abnormal recognition and detection result is determined by viewing the recognition and detection results of a local partial area.

Figure 9:
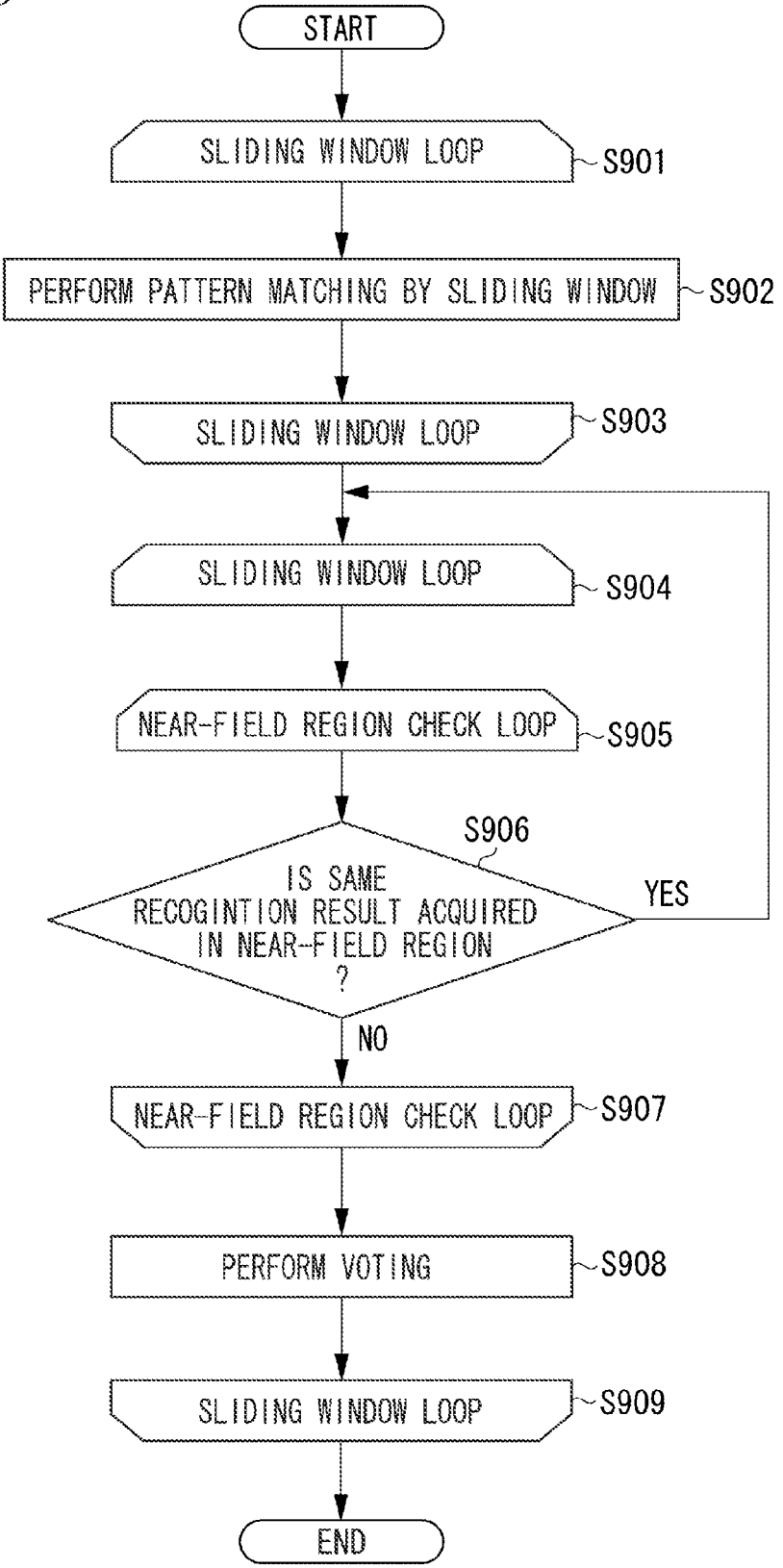
FIG. 9 is a flowchart illustrating in detail a voting appropriateness evaluation process according to a second exemplary embodiment of the present invention.

FIG. 9 is a flowchart illustrating the process according to the present exemplary embodiment. Step S901 corresponds to step S801 illustrated in FIG. 8, step S902 to step S802, and step S903 to step S804, and similar processes are performed in the corresponding steps. According to the second exemplary embodiment, it is determined in the loop process from step S905 to step S907, whether there is a similar recognition and detection result in a near-field region of the sliding window. For example, if the position of the sliding window is (i, j), the recognition and detection result is searched in a 5×5 near-field region in the range of i−2≤x≤i+2 and j−2≤y≤j+2. In step S906, it is determined whether the same recognition and detection result exists in the near-field region. If the number of the same recognition and detection results existing in the near-field region is greater than or equal to a predetermined threshold value (e.g., 1) (YES in step S906), it is determined that the same recognition result as the sliding window exists in the proximal area. The process then returns to step S904. On the other hand, if it is determined that the same recognition and detection result does not exist in the near-field region (NO in step S906), the process proceeds to step S908. In step S908, the voting process is normally performed.

The voting process may be performed even when it is determined in step S906 that there is the same recognition result, by reducing the weight of voting (e.g., to half of the original voting), similarly as in the first exemplary embodiment. Further, not performing voting can be viewed as setting an intensity of voting to 0. Furthermore, if the method for adjusting the weight of voting is generalized, it becomes a method for multiplying a predetermined function (e.g., {1/(1+appearance frequency in the near-field region)}) to voting. The predetermined function to be multiplied to voting may be any function as long as it monotonically decreases the appearance frequency in the near-field region.

The present invention may be embodied as a system, an apparatus, a method, a program, or a storage medium. More specifically, the present invention may be applied to a system including a plurality of devices or to an apparatus including a single device.

The present invention can also be achieved by directly or remotely providing a program of software for implementing functions of the above-described exemplary embodiments to a system or an apparatus that reads and executes the program code. In this case, the program is a computer program corresponding to the flowcharts illustrated in the exemplary embodiments.

Further, in addition to realizing above mentioned function of the exemplary example by reading the computer readable program and executing it by the computer, an OS or the like working on a computer can also perform a part or the whole of processes in cooperation with the program according to instructions of the program and realize functions of the above-described exemplary embodiments.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-166603 filed Jul. 24, 2010, which is hereby incorporated by reference herein in its entirety.

What is claimed is:

1. An information processing method comprising:
obtaining an image including a target object;
obtaining a plurality of partial images of the image;
deciding which partial learning image corresponds to each obtained partial image, wherein the partial learning image is a part of a learning image and is registered in a dictionary;
obtaining a number of the partial images which are decided to correspond to the partial learning image for each partial learning image;
determining whether a decision result for each partial learning image is appropriate based on the number of the partial images which are decided to correspond to the partial learning image for each partial learning image; and
identifying an attribute of the target object based on a determination result.

2. The information processing method according to claim 1, wherein the attribute is at least one of a position, an orientation, and a category of the target object.

3. The information processing method according to claim 1, further comprising:
registering a decision result in the deciding based on a determination result in the determing;
wherein in the identifying, the attribute of the target object is identified based on a registration result.

4. The information processing method according to claim 3, wherein in the determining, a probability of an event in which the decision result has occurred is obtained based on the number of the partial images which are determined to correspond to the partial learning image, and the decision result is determined as being inappropriate in a case where the probability is higher than a predetermined value, and
wherein the registering is performed based on a decision result other than a decision result determined to be inappropriate.

5. The information processing method according to claim 1, wherein in the determining, the appropriateness of the decision result is determined using an appearance frequency at which an area regarded to be similar to the partial areas appears in a near-field region of the partial image detected in the image.

6. The information processing method according to claim 1, wherein in the determining, a decision is performed by pattern matching with the partial learning image.

7. An information processing apparatus comprising:
an obtaining unit configured to obtain an image including a target object;
an obtaining unit configured to obtain a plurality of partial images of the image;
a deciding unit configured to decide which partial learning image corresponds to each obtained partial image, wherein the partial learning image is a part of a learning image and is registered in a dictionary;
obtaining a number of the partial images which are decided to correspond to the partial learning image for each partial learning image;
a determining unit configured to determine whether a decision result for each partial learning image is appropriate based on the number of the partial images which are decided to correspond to the partial learning image for each partial learning image; and
an identification unit configured to identify an attribute of the target object based on a determination result.

8. A non-transitory computer-readable storage medium storing a program for causing a computer to execute the information processing method according to claim 1.

9. The information processing method according to claim 3,
wherein in the determining, if the number of the partial images which is determined to correspond to the partial learning image is greater than a threshold value, the decision result is determined to be inappropriate, and
wherein the registering is performed based on a decision result other than a decision result determined to be inappropriate.

10. An information processing method comprising:
obtaining, as first obtaining, an input image including a target object which belongs to any of a plurality of categories;
obtaining, as second obtaining, a plurality of partial images configuring the input image;
extracting at least one feature amount from the plurality of partial images;
deciding, based on the at least one feature amount extracted in the extracting, which category of a partial learning image registered in a dictionary for identifying a category of the target object corresponds to each of the plurality of partial images;
determining whether a decision result obtained in the deciding for each partial learning image is appropriate, based on an appearance frequency of the category of the partial learning image which the plurality of partial images correspond to;
identifying a category of the target object based on a result of determining the appropriateness of the decision result obtained in the deciding.

11. The information processing method according to claim 10, wherein the category is an orientation of the target object.

12. The information processing method according to claim 10,
further comprising
registering the decision result at a predetermined position of the target object, based on a result of determining the appropriateness of the decision result obtained in the deciding, and
wherein in the identifying a class and a position of the target object are identified based on a registration results obtained in the registering.

13. An information processing apparatus comprising:
- a first obtaining unit configured to obtain an input image including a target object which belongs to any of a plurality of categories;
- a second obtaining unit configured to obtain a plurality of partial images configuring the input image;
- an extraction unit configured to extract at least one feature amount from the plurality of partial images;
- a holding unit configured to hold a dictionary in which a category of a partial learning image configuring a learning image for recognizing the target object is registered;
- a third obtaining unit configured to decide based on the at least one feature amount extracted by the extraction unit, which category, from the dictionary, a category of the target object corresponds to each of the plurality of partial images;
- a determining unit configured to determine whether the decision result obtained by the third obtaining unit, based on an appearance frequency of the obtained category of the partial learning image; and
- an identification unit configured to identify a category of the target object based on a result of determining the appropriateness of the decision result obtained by the third obtaining unit.

14. A non-transitory computer-readable storage medium storing a program for causing a computer to execute a method, the method comprising:
- obtaining, as first obtaining, an input image including a target object which belongs to any of a plurality of categories;
- obtaining, as second obtaining, a plurality of partial images configuring the input image;
- extracting at least one feature amount from the plurality of partial images;
- deciding, based on the at least one feature amount extracted in the extracting, which category of a partial learning image registered in a dictionary for identifying a category of the target object corresponds to each of the plurality of partial images;
- determining whether a decision result obtained in the deciding for each partial learning image is appropriate, based on an appearance frequency of the category of the partial learning image which the plurality of partial images correspond to;
- identifying a category of the target object based on a result of determining the appropriateness of the decision result obtained in the deciding.

15. The method according to claim 3, wherein the registering is performed by weighting the decision result according to the appropriateness determined in the determining.

16. The method according to claim 10, wherein the registering is performed by weighting the decision result according to the appropriateness determined in the determining.

17. The method according to claim 10, wherein the appearance frequency is a number of the partial image is corresponded to the category of the partial learning image.

18. The information processing method according to claim 12,
- wherein in the determining, a decision result is determined as being inappropriate in a case where a number of the partial image is more than a threshold number, and
- wherein the registering is performed based on a decision result other than a decision result determined to be inappropriate.

19. The information processing method according to claim 12,
- wherein in the determining, a probability of an event in which the decision result has occurred is obtained based on a number of the partial image is corresponded to the category of the partial learning image and the decision result is determined as being inappropriate in a case where the probability is higher than a predetermined value, and
- wherein the registering is performed based on a decision result other than a decision result determined to be inappropriate.

* * * * *